United States Patent
Katsuya (10) Patent No.: US 7,038,740 B1
(45) Date of Patent: May 2, 2006

(54) LIQUID CRYSTAL DISPLAY DEVICE HAVING HIGH LIGHT UTILIZATION EFFICIENCY

(75) Inventor: Yoko Katsuya, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 482 days.

(21) Appl. No.: 09/617,120

(22) Filed: Jul. 14, 2000

(30) Foreign Application Priority Data

Jul. 21, 1999 (JP) ................................. 11-206090

(51) Int. Cl.
*G02F 1/1343* (2006.01)
*G02F 1/136* (2006.01)

(52) U.S. Cl. .......................... 349/38; 349/43; 349/139

(58) Field of Classification Search ............ 349/42–43, 349/38, 3, 139
See application file for complete search history.

(56) References Cited

U.S. PATENT DOCUMENTS

| | | | | |
|---|---|---|---|---|
| 5,668,613 A | | 9/1997 | Kim et al. | 349/38 |
| 5,745,195 A | * | 4/1998 | Zhang | 349/39 |
| 5,790,213 A | | 8/1998 | Sasaki et al. | 349/48 |
| 5,982,460 A | * | 11/1999 | Zhang et al. | 349/39 |
| 6,482,684 B1 | * | 11/2002 | Yamazaki | 438/158 |
| 6,690,031 B1 | * | 2/2004 | Ohtani et al. | 257/71 |

FOREIGN PATENT DOCUMENTS

| | | |
|---|---|---|
| JP | 4-194823 A | 7/1992 |
| JP | 5-216067 | 8/1993 |
| JP | 5-216067 A | 8/1993 |
| JP | 5-265039 A | 10/1993 |
| JP | 6-148684 A | 5/1994 |
| JP | 10-153793 A | 6/1998 |
| JP | 2000-267128 A | 9/2000 |

* cited by examiner

*Primary Examiner*—Dung T. Nguyen
(74) *Attorney, Agent, or Firm*—Nixon & Vanderhye P.C.

(57) ABSTRACT

There is provided a liquid crystal display device that can obtain a high light utilization efficiency and a sufficient supplementary capacitance without reducing an aperture rate of pixels and is able to attain higher resolution. A silicon nitride film 22 that serves as a supplementary capacitance use transparent insulating film is formed under a pixel electrode 3. A common electrode 21 that is made of ITO and is connected to a potential common to an opposite electrode is formed under the silicon nitride film 22. The pixel electrode 3, the silicon nitride film 22 and the common electrode 21 constitute the supplementary capacitance, and the pixel electrode 3, the silicon nitride film 22 and the common electrode 21 are each made to have a film thickness such that a transmittance is increased by interference at a specified wavelength.

33 Claims, 5 Drawing Sheets

LIQUID CRYSTAL DISPLAY DEVICE HAVING HIGH LIGHT UTILIZATION EFFICIENCY

BACKGROUND OF THE INVENTION

The present invention relates to a liquid crystal display device that employs a thin film transistor array substrate provided with a supplementary capacitance for each pixel.

In recent years, as a thin type light-weight display having a low power consumption, an active matrix type liquid crystal display device in which each pixel electrode is controlled by a semiconductor element such as a thin film transistor provided for each pixel electrode has attracted a great deal of attention among, in particular, liquid crystal display devices, since the device can obtain an excellent resolution and a vivid image. Reference will be made below to the active matrix type liquid crystal display device.

As a semiconductor element for use in the conventional active matrix type liquid crystal display device, a thin film transistor constructed of an amorphous silicon thin film has been known, and a great many active matrix type liquid crystal display devices mounted with the thin film transistors are currently produced on the commercial basis. The active matrix type liquid crystal display device is about to go mainstream as a display for Office Automation equipment and commercial equipment.

With regard to the active matrix type liquid crystal display device, a transmission type liquid crystal display device that employs a transparent conductive thin film of ITO (Indium Tin Oxide) or the like for pixel electrodes is general. In the active matrix type liquid crystal display device, a capacitor is constructed by holding a liquid crystal layer between the pixel electrode and an opposite electrode provided on the opposite substrate side, and display is effected by retaining the electric potential of the pixel electrode at a predetermined voltage for a specified period in correspondence with an image signal. However, the display may be deteriorated by the potential reduction of the pixel electrode due to the electric discharge of the capacitor ascribed to a leak current or the like when the pixel use thin film transistor is turned off. It is sometimes the case where the pixel potential might fluctuate under the influence of the potentials of the neighbor wiring. Accordingly, in order to prevent the above-mentioned potential fluctuation of the pixel electrode, a supplementary capacitance is normally formed parallel to the capacitor.

The conventional supplementary capacitance has often been formed by using a gate insulating film as a dielectric film for forming the supplementary capacitance, using a capacitive wiring formed on a layer identical to that of a gate wiring or the gate wiring as one electrode and holding the dielectric film between the one electrode and a drain electrode or a pixel electrode. The reason for the above is that the dielectric film can be formed concurrently with the fabrication of the thin film transistor and that a gate insulating film having a good quality can be utilized for the dielectric film.

Figure 7:
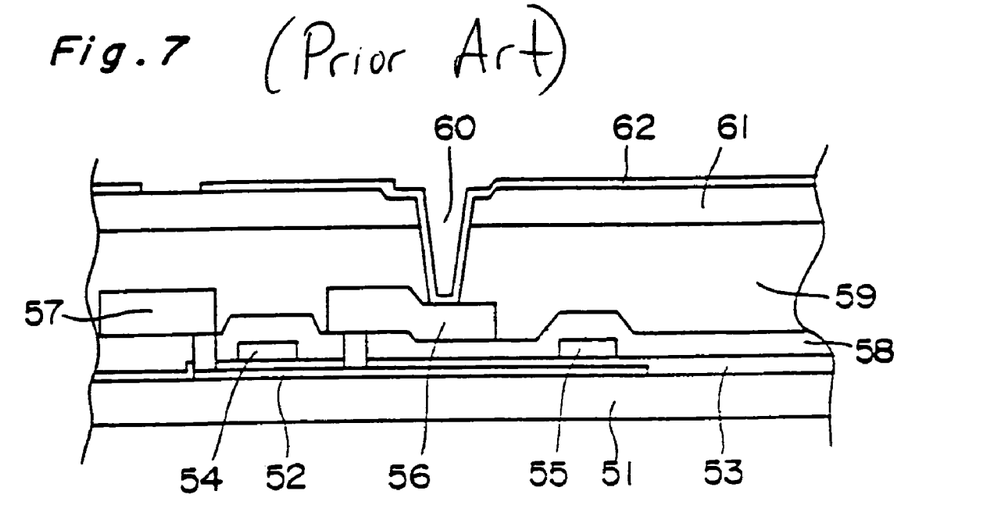
FIG. 7 is a sectional view of essential part of the thin film transistor array substrate of a conventional liquid crystal display device.

As a liquid crystal display device in which the supplementary capacitance is formed by the fabricating method described above, there is one shown in FIG. 7. As shown in FIG. 7, this liquid crystal display device has a polysilicon 52 that is formed on a transparent substrate 51 and patterned in an island-like shape, a gate insulating film 53 formed on the polysilicon 52, a gate electrode 54 and a common electrode 55 formed on the gate insulating film 53, a first interlayer insulating film 58 formed on the gate insulating film 53, the gate electrode 54 and the common electrode 55, a drain electrode 56 and a source electrode 57 formed on the first interlayer insulating film 58, a second interlayer insulating film 59 formed on the first interlayer insulating film 58, the drain electrode 56 and the source electrode 57, a transparent conductive film 61 formed on the second interlayer insulating film 59 and a pixel electrode 62 that is formed on the transparent conductive film 61 and is electrically connected to the drain electrode 56 at a contact hole 60. The supplementary capacitance is formed by using the gate insulating film 53 as a dielectric film and holding the gate insulating film 53 between the common electrode 55 and the polysilicon 52 (a region located on the connected drain electrode 56 side).

However, the aforementioned liquid crystal display device uses the gate insulating film 53 directly as a dielectric film for forming the supplementary capacitance. Therefore, although the fabricating method becomes relatively simple, it is often the case where the film thickness and the like of the gate insulating film are restricted to a certain extent in order to assure the performance of the thin film transistor. Due to this restriction, it has not been easy to concurrently assure the performances required for the gate insulating film and the dielectric film. Also, the capacitive wiring is formed in the same layer as that of the gate wiring, and therefore, it is difficult to secure a capacitive electrode area for forming a sufficient supplementary capacitance in assuring the processing accuracy of a photolithographic process and an etching process or the aperture rate of the pixel. The above fact has tended to be more significant as the processing dimensions of the thin film transistor become smaller, i.e., as the panel has a higher resolution with the dimensional reduction of the pixels. As described above, the conventional liquid crystal display device has the problem that the formation of the sufficient supplementary capacitance is very hard to achieve according to the improvement in the resolution of the liquid crystal display device.

Furthermore, the liquid crystal display device generally receives the influence of the electric fields of the adjacent electrodes at the boundaries of the pixel electrodes and the influence of the electric field of the bus line. This might cause the display of an image different from the image intended to be displayed on the pixel or the leak of light due to the absence of an electric field. Therefore, it is not appropriate to use the boundary portions of mutually adjoining pixel electrodes for display, and normally these portions are shielded by a black matrix. Conventionally, the black matrix has been required to be constructed of another layer. For example, Japanese Patent Laid-Open Publication No. HEI 5-216067 and so on propose the use of the bus line as a black matrix. However, in practice, there is the problem that the display becomes unstable under the influence of a bus line signal exerted on the pixel electrodes.

SUMMARY OF THE INVENTION

Accordingly, the object of the present invention is to provide a liquid crystal display device that can obtain high light utilization efficiency and a sufficient supplementary capacitance without reducing the aperture rate of the pixels and has a good display quality capable of achiving the higher resolution.

In order to achieve the aforementioned object, the present invention provides a liquid crystal display device comprising a thin film transistor array substrate including: pixel use thin film transistors, which are formed on an insulating substrate and each of which has a gate electrode, a source electrode and a drain electrode; pixel electrodes, which are formed on the insulating substrate and comprised of a transparent conductive film connected to the respective pixel use thin film transistors; and a supplementary capacitance for retaining electric charges of the pixel electrodes, and a liquid crystal layer held between the thin film transistor array substrate and an opposite substrate, the supplementary capacitance being provided by the pixel electrodes, a supplementary capacitance use transparent insulating film formed under at least the pixel electrodes and a common electrode that is formed under the supplementary capacitance use transparent insulating film and comprised of a transparent conductive film connected to a specified potential, and the pixel electrodes, the supplementary capacitance use transparent insulating film and the common electrode having a film thickness such that the electrodes and film have a transmittance increased by interference at a specified wavelength.

According to the liquid crystal display device constructed as above, the potential of the pixel electrode applied by the pixel use thin film transistor is retained by the capacitance formed by holding the liquid crystal layer between the pixel electrode and an opposite electrode provided on the opposite substrate side. Furthermore, the auxiliary electrode constructed of the pixel electrode, the supplementary capacitance use transparent insulating film and the common electrode prevents the fluctuation in potential of the pixel electrode ascribed to a leak current or the like when the pixel use thin film transistor is turned off and the potentials of the neighbor wiring. Both the common electrode and the pixel electrode are formed of transparent conductive films (ITO or the like). This arrangement does not become a factor for obstructing the display, and the aperture rate is highly retained. The pixel electrode and the common electrode made of the transparent conductive film have a refractive index greater than that of the glass substrate or the like. Therefore, depending on the film forming conditions, the films become the films for absorbing the light in the short wavelength region, while reflection tends to occur on the interfaces of the pixel electrode and the common electrode due to the fact that the refractive index is different from those of the glass substrate and the silicon oxide film, often causing a reduction in light utilization efficiency. Therefore, the film thicknesses of the pixel electrode and the common electrode are optimized so that the transmittance of light becomes high at the specified wavelength, and the film thickness of the supplementary capacitance use transparent insulating film is also optimized so that the transmittance of light becomes high at the specified wavelength. With this arrangement, the pixel electrode, the supplementary capacitance use transparent insulating film and the common electrode are formed into high-quality films that absorb a small quantity of light. This arrangement can restrain the loss of the transmission light even if the common electrode is formed roughly on the entire surface. This arrangement thus allows the supplementary capacitance to be increased without reducing the aperture rate of the pixel and optimizes not only the physical aperture rate but also the transmittance at the opening, consequently increasing the light utilization efficiency. Therefore, a high light utilization efficiency and a sufficient supplementary capacitance can be obtained without reducing the aperture rate even in a high-definition panel, so that a liquid crystal display device having a high display quality can be provided.

In one embodiment, a difference between a refractive index of the supplementary capacitance use transparent insulating film and a refractive index of the pixel electrodes is set to a value of not greater than 0.6 and a difference between a refractive index of the supplementary capacitance use transparent insulating film and a refractive index of the common electrode is set to a value of not greater than 0.6.

According to the liquid crystal display device of the above embodiment, the refractive index differences are each not greater than 0.6, and therefore, stabilized high light transmission characteristics can be obtained.

In one embodiment, the pixel electrode and the common electrode are made of a material having a specific resistance of 1 m$\Omega$-cm or less.

According to the liquid crystal display device of the above embodiment, the pixel electrode and the common electrode constructed of the transparent conductive film exert influence on the display as a consequence of the generation of a potential difference in the planes thereof if their resistances are high. However, by virtue of the formation of the pixel electrodes and the common electrode roughly in the entire plane of the screen, their resistances matter less than when the electrodes are formed in linear shapes. However, a material having a resistance of not greater than 1 m$\Omega$-cm is preferable.

In the liquid crystal display device of one embodiment, the pixel electrodes have edge portions overlapping gate bus lines and source bus lines formed on the insulating substrate, and the common electrode is arranged between the gate bus lines and the pixel electrodes and between the source bus lines and the pixel electrodes so as to cover the gate bus lines and the source bus lines.

According to the liquid crystal display device of the above embodiment, the edge portions of the pixel electrodes are made to overlap the source bus lines and the gate bus lines, so that the boundaries of mutually adjoining pixel electrodes are provided on the source bus lines and the gate bus lines. With this arrangement, the source bus lines and the gate bus lines can be used as a black matrix. This arrangement obviates the need for separately forming a black matrix and is able to eliminate the black matrix forming process and reduce the cost. Furthermore, the common electrode is arranged between the gate bus lines and the pixel electrodes and between the source bus lines and the pixel electrodes so as to cover the gate bus lines and the source bus lines. With this arrangement, electric fields attributed to the bus line signals are shielded by the common electrode, by which the potentials of the pixel electrodes become hard to receive the influence of the bus line signals, allowing a good display quality to be obtained.

In the liquid crystal display device of one embodiment, the supplementary capacitance use transparent insulating film is any one of a silicon oxide film, a silicon nitride film and an organic resin film or a laminate film comprised of at least two of the silicon oxide film, the silicon nitride film and the organic resin film.

According to the liquid crystal display device of the above embodiment, if the flat insulating layer is formed of any one of the silicon oxide film and a silicon nitride film, which are inorganic materials, and an organic resin film (acrylic resin, polyimide or the like) by the spin coating method or the like as an insulating material between the common electrode and the pixel electrode for the formation of the supplementary capacitance, then the surface unevenness is reduced, which is effective in terms of uniforming the electric fields to be applied to the liquid crystal molecules. Furthermore, by forming the supplementary capacitance use transparent insulating film of a lamination of at least two of the silicon oxide film, the silicon nitride film and the organic resin film, both the dielectric properties and flatness can be secured.

In the liquid crystal display device of one embodiment, the pixel use thin film transistor has an active layer made of polysilicon, and drive circuit use thin film transistors whose active layers are made of polysilicon are formed on the insulating substrate identical to the substrate on which the pixel use thin film transistors are formed.

According to the liquid crystal display device of the above embodiment, the pixel use thin film transistor and the drive circuit use thin film transistor, of which the active layers are made of polysilicon, have a mobility higher than that of the amorphous silicon thin film employed in the conventional thin film transistor. Therefore, a high-performance thin film transistor can be formed within a small area. Therefore, the pixel use thin film transistor and the drive circuit use thin film transistor for driving the pixel use thin film transistor can be integrally formed on one inexpensive glass substrate. This obviates the need for separately providing a substrate for the drive circuit section constructed of an IC (Integrated Circuit) and an LSI (Large Scale Integrated Circuit), allowing the manufacturing cost to be remarkably reduced by comparison with the conventional case. Therefore, a low-cost liquid crystal display device that employs a thin film transistor array substrate integrated with a drive circuit can be provided.

In the liquid crystal display device of one embodiment, the active layers of the pixel use thin film transistors and the drive circuit use thin film transistors are polysilicon films crystallized by utilizing a catalytic effect of an introduced catalytic element.

According to the liquid crystal display device of the above embodiment, by introducing a catalytic element (nickel, for example) and using the polysilicon film crystallized by utilizing its catalytic effect for the active layer of the thin film transistor, the drive circuit section can be easily formed within a small area even in a high-definition panel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The liquid crystal display device of the present invention will be described below on the basis of the embodiment thereof shown in the drawings.

Figure 1:
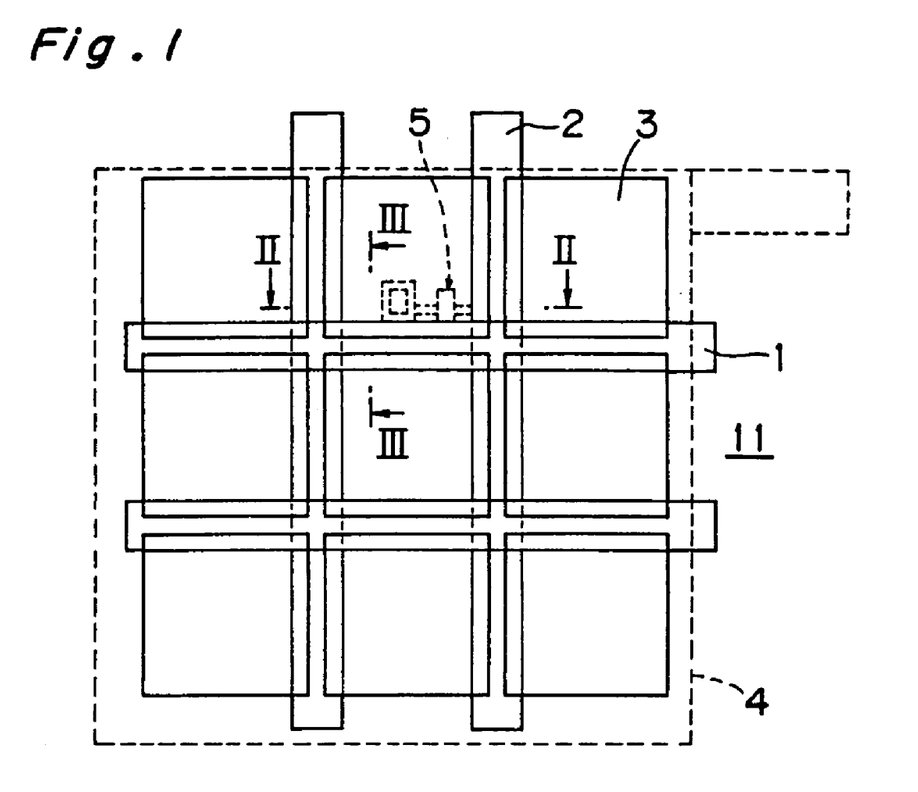
FIG. 1 is a schematic plan view of the thin film transistor array substrate of a liquid crystal display device according to one embodiment of the present invention.

FIG. 1 is a schematic plan view of the thin film transistor array substrate of a liquid crystal display device according to one embodiment of the present invention, showing a planar type thin film transistor array of the thin film transistor array substrate that employs polysilicon.

As shown in FIG. 1, according to the thin film transistor array substrate, a plurality of gate bus lines 1, a plurality of signal lines 2 formed perpendicularly to the plurality of gate bus lines 1 and a plurality of pixel electrodes 3 arranged so that their edges overlap the gate bus lines 1 and the signal lines 2 are formed on a transparent substrate 11. The transparent substrate 11 is made of aluminoborosilicate glass having a high heat resistance. Although FIG. 1 shows 3×3 pixel electrodes for the sake of providing a clear view, the number of pixel electrodes is not limited to this. A liquid crystal display device is constructed by holding a liquid crystal layer (not shown) between the thin film transistor array substrate and an opposite substrate (not shown) having an opposite electrode.

Figure 2:
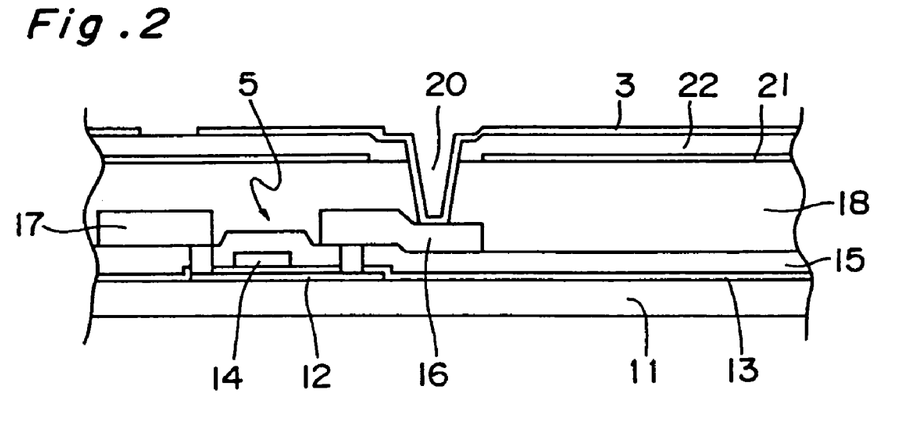
FIG. 2 is a sectional view taken along the line II—II in FIG. 1.
Figure 3:
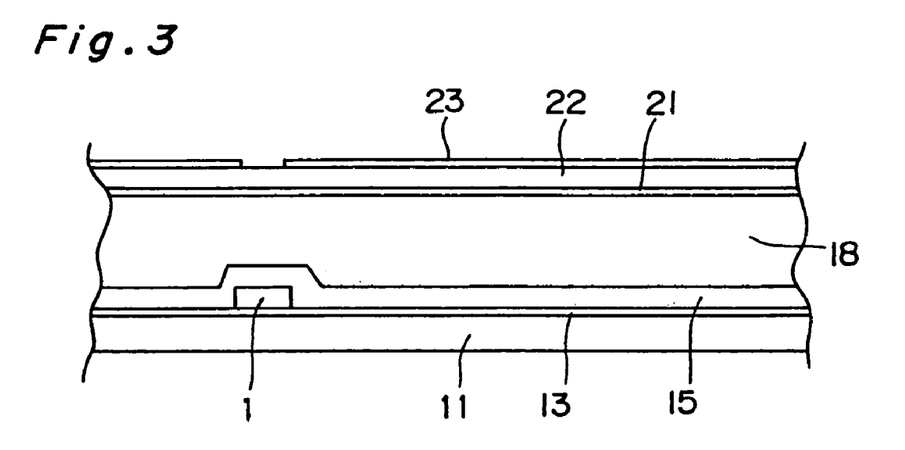
FIG. 3 is a sectional view taken along the line III—III in FIG. 1.

FIG. 2 is a sectional view taken along the line II—II in FIG. 1, while FIG. 3 is a sectional view taken along the line III—III in FIG. 1.

As shown in FIG. 2 and FIG. 3, a base coat layer (not shown) is first formed on the transparent substrate 11, and after growing a polysilicon film on the base coat layer, the polysilicon film is patterned in an island-like shape to form a polysilicon 12. The polysilicon 12 is grown in a crystal form with nickel introduced as a catalyst. Subsequently, an SiO$_2$ film is formed to a thickness of about 100 nm on the transparent substrate 11 and the polysilicon 12 by the CVD (Chemical Vapor Deposition) method, forming a gate insulating film 13. The gate insulating film 13 may be formed by the plasma CVD method, the atmospheric pressure CVD method or the sputtering method.

Next, the gate bus lines 1 and the signal lines 2 (shown in FIG. 1) are formed of an Al alloy on the gate insulating film 13, and gate electrodes 14 connected to the gate bus lines 1 are formed. A silicon oxide film 15 is formed as a first interlayer insulating film on the gate bus lines 1 and the gate electrodes 14. Next, drain electrodes 16 and source electrodes 17 are formed of a metal to a thickness of about 700 nm, and thereafter a flattening use resin film 18 is formed as a protecting film and a second interlayer insulating film.

Subsequently, a transparent conductive film that serves as a common electrode 21 for the formation of a capacitance is formed to a thickness of about 140 nm, forming a silicon nitride film 22 that serves as a supplementary capacitance use transparent insulating film to a thickness of about 145 nm. The gate bus lines 1 and the signal lines 2 are subjected to taper etching for the prevention of disconnection. The common electrode 21 for the formation of the capacitance is formed almost on the entire surface except for the contact forming portions (at and around contact holes 20).

Then, the contact holes 20 are formed through the flattening use resin film 18 and the silicon nitride film 22 located on the drain electrodes 16. Thereafter, a transparent conductive film is formed to a thickness of 140 nm on the silicon nitride film 22 and the contact holes 20 and then patterned to form pixel electrodes 3. The pixel electrodes 3 are connected to the drain electrodes 16 via the contact holes 20. The pixel electrodes 3 are usually made of ITO. Then, the common electrode 21 and the opposite electrode (not shown) are connected to each other outside the screen so as to have equal potential.

Assuming that the refractive index of the silicon nitride film is n and the wavelength at which the transmittance is desired to be increased is λ, then the film thickness d of the silicon nitride film 22 that serves as the aforementioned supplementary capacitance use transparent insulating film is given by a thickness that satisfies the expression:

$$d=\lambda/(2\times n)\times m \text{ (m: integer)}.$$

Likewise, the pixel electrode 3 and the common electrode 21 are set to the thicknesses that provide the maximum transmittance.

That is, according to the aforementioned embodiment, the film thicknesses of the pixel electrode 3 and the common electrode 21, which are made of ITO, and the silicon nitride film 22 are determined on the basis of the conditions:
refractive index of ITO: 1.9 to 2.0,
refractive index of silicon nitride: 1.9, and
wavelength at which transmittance is desired to be increased: 540 to 550 nm.

The green color (550 nm) is thus considered important in determining the film thickness because the human eye is sensitive to this wavelength region and because the values of illuminance and white color transmittance are determined on the basis of the human visibility. Of course, the transmittance is desired to be high at R (Red), G (Green) and B (Blue) since the colorific taste of the white color shifts if only the transmittance of green color is high. However, the film thickness that satisfies all these factors is not practical with this construction.

As described above, the pixel electrode 3 and the common electrode 21, which are made of ITO that is the transparent conductive film, overlap each other to form the supplementary capacitance via the silicon nitride film 22 that serves as the supplementary capacitance use transparent insulating film. Therefore, by maintaining the aperture rate without obstructing the display and optimizing the film thicknesses of the pixel electrode 3 and the common electrode 21 so that the transmittance becomes high with respect to light at the predetermined wavelength of 540 nm to 550 nm for the formation of the pixel electrode 3 and the common electrode 21 into high-quality films that absorb a small quantity of light, the loss of transmission light is restrained. The above arrangement can increase the supplementary capacitance without reducing the aperture rate of the pixel and increases the light utilization efficiency by optimizing the transmittance at the opening. Therefore, a liquid crystal display device having an excellent display quality capable of obtaining a sufficient supplementary capacitance without reducing the light utilization efficiency can be provided even for a high-definition panel.

By setting the refractive index of the supplementary capacitance use transparent insulating film (silicon nitride film 22) to a value of not smaller than 1.4 and setting a difference in refractive index between the supplementary capacitance use transparent insulating film 22 and the pixel electrode 3 and a difference in refractive index between the supplementary capacitance use transparent insulating film 22 and the common electrode 21 to a value of not greater than 0.6, the film thicknesses can be easily controlled as follows so as to provide a high transmittance by interference.

A transmission ratio T and a reflectance ratio R at the interface with respect to a perpendicular incident light are as follows:

$$R=(n1-n0)^2(n1+n0)$$

$$T=1-R$$

when the light is incident from a medium 0 (refractive index n0) on a medium 1 (refractive index n1). In this case, if the difference between n1 and n0 is small, then the reflectance is small and the transmittance is great.

Figure 4:
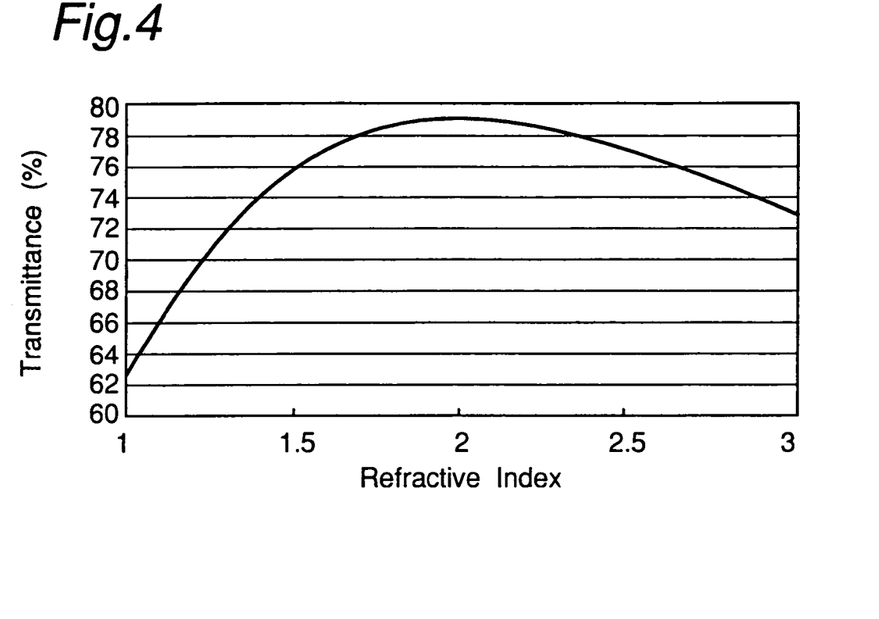
FIG. 4 is a view showing a relation between the refractive index and the transmittance of a transparent insulating film for a supplementary capacitance.

FIG. 4 shows the result of calculation of a supplementary capacitance use transparent insulating film held between ITO's (n=2.0) on the assumption that the interfacial reflection is entirely the loss. If the difference in refractive index is 0.6, then the transmittance is reduced by about 5% (with respect to 100% when the difference is zero).

Figure 5:
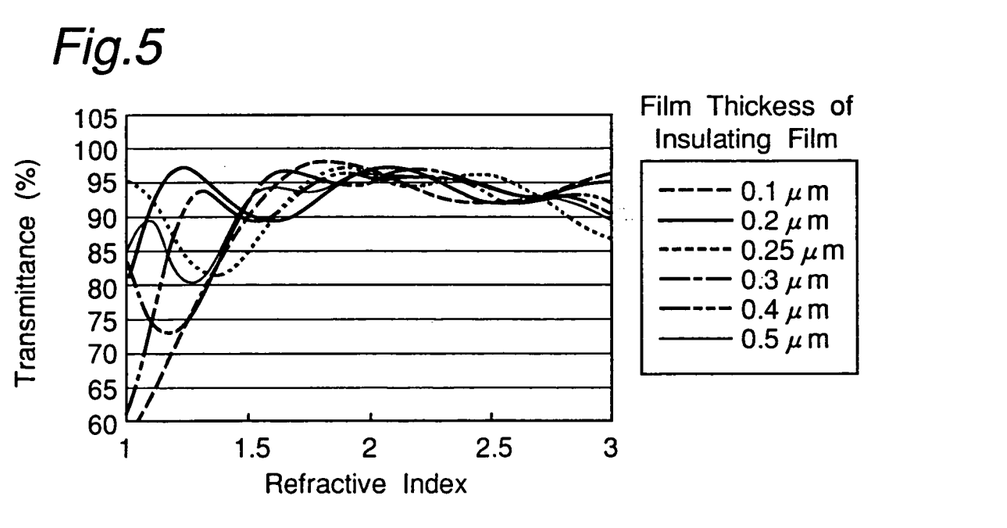
FIG. 5 is a view showing a relation between the refractive index and the transmittance of the transparent insulating film depending on the film thickness.

Practically, in the case of a thin film, the reflected light is reflected on another interface, causing interference. The transmittance depending on the calculated thickness is shown in FIG. 5. As described above, the transmittance varies depending on the thickness and the refractive index. However, in the actual films, the interfaces of the films are not completely parallel, and diffusion and the like occur at the interfaces. Therefore, in practice, a transmittance of the combination of FIG. 4 and FIG. 5 results.

The optimum refractive index varies in relation to the interference. However, if the refractive index difference exceeds 0.6, then the width of fluctuation with respect to the film thickness becomes great, resulting in difficulties in obtaining stable characteristics.

If the refractive index difference is small, then the reflection on the interface itself is reduced. This consequently reduces the influence of the interfacial structure and so on and allows stable light transmission characteristics to be obtained.

By forming the pixel electrode 3 and the common electrode 21 of a material having a specific resistance of not greater than 1-Ωcm no bad influence is exerted on the display due to the possible occurrence of a potential difference inside the screen because of the high resistance.

The edge portions of the pixel electrodes 3 are made to overlap the signal lines 2 (source bus lines) and the gate bus lines 1, so that the boundaries between mutually adjoining pixel electrodes 3 are provided on the signal lines 2 and the gate bus lines 1. The common electrode 21 is arranged between the gate bus lines 1 and the pixel electrodes 3 and between the signal lines 7 and the pixel electrodes 3 so as to cover the gate bus lines 1 and the signal lines 2. With the above arrangement, the signal lines 2 and the gate bus lines 1 can be used as a black matrix. This obviates the need for separately forming a black matrix and is therefore able to eliminate the black matrix forming process, reducing the cost. Furthermore, the common electrode 21 exists between the gate bus lines 1 and the pixel electrodes 3 and between the signal lines 2 and the pixel electrodes 3. With this arrangement, electric fields attributed to the signals of the gate bus lines 1 and the signal lines 2 are shielded by the common electrode 21, so that the potentials of the pixel electrodes 3 become hard to receive the influence of the signals of the gate bus lines 1 and the signal lines 2, allowing an excellent display to be provided.

The silicon nitride film 22 is used for the supplementary capacitance use transparent insulating film. However, if the flat insulating layer is formed of either the silicon oxide film or the organic resin film (acrylic resin, polymide or the like) by the spin coating method or the like, then this arrangement is effective in terms of reducing the surface unevenness and uniforming the electric fields to be applied to the liquid crystal molecules. Furthermore, by forming the supplementary capacitance use transparent insulating film of a lamination of at least two of the silicon oxide film, the silicon nitride film and the organic resin film, both the dielectric properties and flatness can be secured.

Furthermore, by using a high-mobility high-performance thin film transistor whose active layer is made of polysilicon for the pixel use thin film transistor and the drive circuit use thin film transistor, the pixel use thin film transistor and the drive circuit use thin film transistor can be integrally formed on an inexpensive glass substrate. This arrangement obviates the need for separately providing a substrate for the drive circuit section constructed of an IC (Integrated Circuit) and an LSI (Large Scale Integrated Circuit), allowing the manufacturing cost to be remarkably reduced.

Furthermore, by introducing a catalytic element (nickel, for example) and using the polysilicon film crystallized by utilizing its catalytic effect for the active layer of the thin film transistor, the drive circuit section can be easily formed within a small area even in a high-definition panel.

In the case where a top gate type transistor (transistor having a structure in which the gate electrode is located above the semiconductor layer) is used as the pixel use transistor, if the principal light is made incident from above the insulating substrate (i.e., from the pixel electrode side), then the light can be prevented from being incident on the active layer under the gate electrode of the pixel use thin film transistor, which is effective in terms of stabilizing the operation of the transistor. If a coating film made of a material of the layer identical to that of the source bus line is provided on the upper layer of the gate bus line in the portion where the active layer of the thin film transistor and the gate bus line intersect each other, then the light shielding effect is further improved to allow the operation to be further stabilized.

Although ITO is used for the pixel electrodes 3 and the common electrode 21 in the aforementioned embodiment, it is acceptable to use $SnO_2$ besides ITO or a material made principally of the materials.

Figure 6:
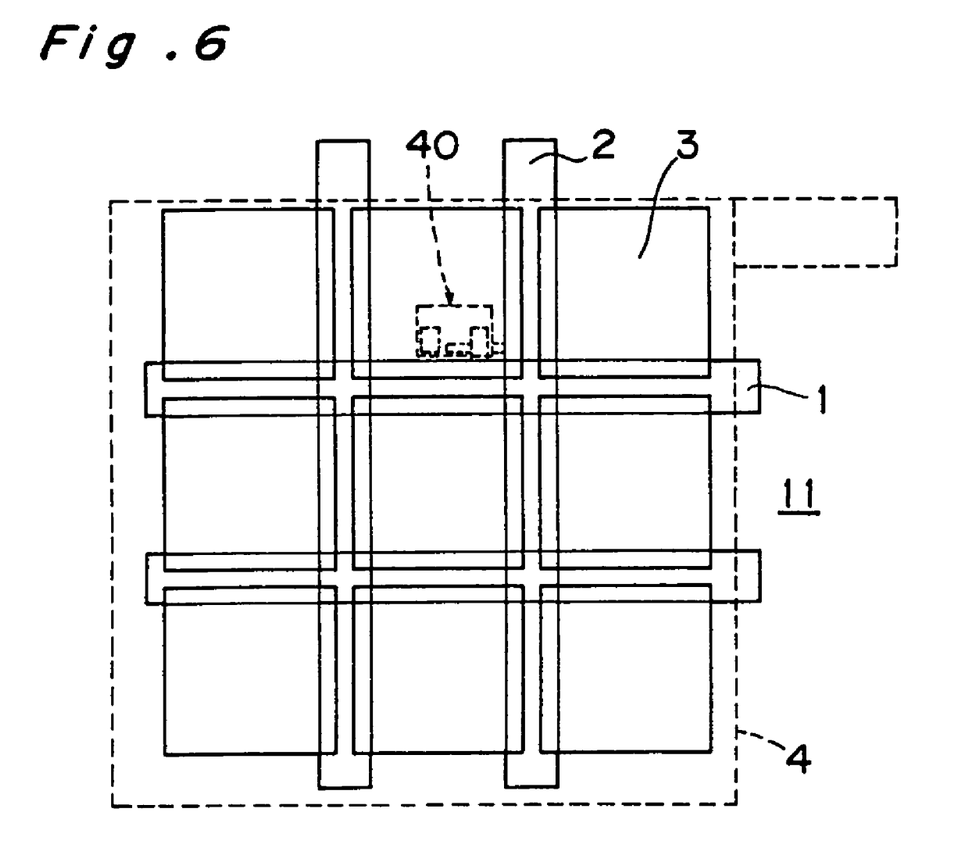
FIG. 6 is a schematic plan view of a thin film transistor array substrate with a dimensionally increased source electrode.

The drain electrode 16 is dimensionally set so that the contact hole 20 can be connected to the drain electrode 16 in the aforementioned embodiment. However, by forming a source electrode 40 expanded in area to the extent that the aperture rate is not reduced more than necessary as shown in FIG. 6, the supplementary capacitance is constructed of the source electrode 40, the common electrode 21 (shown in FIG. 2) and the resin film 18 (shown in FIG. 2), allowing the capabilities of retaining the potential of the pixel electrode to be improved.

Although the silicon oxide film 15 is formed as the first interlayer insulating film in the aforementioned embodiment, the film material is not limited to silicon oxide. Although the silicon nitride film 22 is formed as the supplementary capacitance use transparent insulating film, the supplementary capacitance use transparent insulating film may be formed of silicon oxide, aluminum oxide or the like.

As is apparent from the above, according to the liquid crystal display device of the present invention, if the supplementary capacitance is formed by utilizing the pixel electrode and the common electrode made of the transparent conductive films that overlap each other via the supplementary capacitance use transparent insulating film, then a sufficient supplementary capacitance can be formed without reducing the light utilization efficiency even in a high-definition panel. Furthermore, by forming the common electrode on the upper side of the bus lines so as to cover the lines, the common electrode shields the electric fields of the bus lines. With this arrangement, the potentials of the pixel electrodes become hard to receive the influence of the signals of the bus lines, allowing the display quality to be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:
   a thin film transistor array substrate including thin film transistors supported by an insulating substrate and each of which has a gate electrode, a source electrode and a drain electrode; pixel electrodes comprised of transparent conductive films connected to respective thin film transistors; supplementary capacitances for retaining electric charges of the pixel electrodes; and a liquid crystal layer between at least the thin film transistor array substrate and an opposite substrate,
   the supplementary capacitance for a pixel region comprising a pixel electrode, a supplementary capacitance use transparent insulating film formed under at least the pixel electrode and a common electrode that is formed under the supplementary capacitance use transparent insulating film and comprised of a transparent conductive film connected to a potential, and
   wherein, for the supplementary capacitance in the pixel region, the supplementary capacitance use transparent insulating film has a film thickness d so as to satisfy the following equation:

$$d=\lambda/(2\times n)\times m$$

where m is an integer, and n is an index of refraction of the transparent insulating film of the supplementary capacitance, and $\lambda$ is a wavelength at which transmittance is desired to be increased, so that materials and thicknesses thereof of the supplementary capacitance are selected so as to increase transmittance at the wavelength $\lambda$.

2. A liquid crystal display device as claimed in claim 1, wherein a difference between a refractive index of the supplementary capacitance use transparent insulating film and a refractive index of the pixel electrodes is set to a value of not greater than 0.6 and a difference between a refractive index of the supplementary capacitance use transparent insulating film and a refractive index of the common electrode is set to a value of not greater than 0.6.

3. A liquid crystal display device as claimed in claim 1, wherein the pixel electrode and the common electrode are made of a material having a specific resistance of 1 mΩ-cm or less.

4. A liquid crystal display device as claimed in claim 1, wherein the pixel electrodes have edge portions overlapping gate bus lines and source bus lines formed on the insulating substrate, and the common electrode is arranged between the gate bus lines and the pixel electrodes and between the source bus lines and the pixel electrodes so as to cover the gate bus lines and the source bus lines.

5. A liquid crystal display device as claimed in claim 1, wherein the supplementary capacitance use transparent insulating film is any one of a silicon oxide film, a silicon nitride film and an organic resin film or a laminate film comprised of at least two of the silicon oxide film, the silicon nitride film and the organic resin film.

6. A liquid crystal display device as claimed in claim 1, wherein the pixel uses a thin film transistor having an active layer comprising polysilicon, and a drive circuit thereof uses thin film transistors whose active layers comprising polysilicon are formed on the insulating substrate identical to the substrate on which the thin film transistor of the pixel is formed.

7. A liquid crystal display device as claimed in claim 6, wherein the active layer of the thin film transistor of the pixel and the transistors of the drive circuit are polysilicon films crystallized by utilizing a catalytic effect of an introduced catalytic element.

8. The display of claim 1, wherein the pixel electrode has edge portions overlapping at least one gate bus line and at least one source bus line formed on the substrate, and the another electrode is arranged between the gate bus line and the pixel electrode and between the source bus line and the pixel electrode so as to cover the gate bus line and the source bus line so that the gate bus line and source bus line act as a black matrix.

9. A liquid crystal display comprising:
a pixel electrode in communication with a switching element and supported by a substrate;
a supplemental capacitance for retaining electric charge of the pixel electrode, the supplemental capacitance being comprised of the pixel electrode, another electrode, and a dielectric film provided between the pixel electrode and the another electrode;
wherein a thickness d and index of refraction n of the dielectric film of the supplemental capacitance are selected to satisfy an equation $d=\lambda/(2\times n)\times m$, wherein m is an integer, in order to increase transmittance at a wavelength $\lambda$.

10. The liquid crystal display of claim 9, wherein the dielectric film of the supplemental capacitance has an index of refraction of at least 1.4, and a difference between respective indices of refraction of the dielectric film and the another electrode is no greater than 0.6.

11. The liquid crystal display of claim 9, wherein the index of refraction of the dielectric film is about 1.9.

12. The liquid crystal display of claim 9, wherein the dielectric film comprises silicon nitride.

13. The display of claim 9, wherein the switching element comprises a thin film transistor (TFT) including a gate, a source and a drain, and wherein a gate line is in communication with the gate, and wherein the pixel electrode at least partially overlaps the gate line.

14. The display of claim 13, wherein said another electrode is formed between at least portions of the pixel electrode and the gate line.

15. The display of claim 9, wherein said switching element comprises a transistor including a gate, source and drain, and wherein said another electrode at least partially overlaps at least one of a gate line and a source line of the display, and wherein the gate line and the source line are opaque.

16. The display of claim 9, wherein said another electrode is electrically connected to some other electrode so as to be at a potential.

17. The display of claim 9, wherein said another electrode is transparent.

18. The display of claim 9, wherein said wavelength $\lambda$ is from 540 to 550 nm.

19. The display of claim 9, wherein said pixel electrode comprises ITO.

20. A liquid crystal display comprising:
at least one transistor supported by a substrate;
a pixel electrode comprising a transparent conductive film electrically connected to the transistor through a contact hole defined in at least an insulating film;
an additional electrode located at least partially between the pixel electrode and at least one of a gate line and a source line, wherein said insulating film is provided at least partially between the pixel electrode and the additional electrode, and wherein the additional electrode makes up part of an auxiliary capacitor; and
wherein said insulating film is of a thickness d so as to satisfy the following equation:

$d=\lambda/(2\times n)\times m$ where m is an integer, n is an index of refraction of the insulating film, and $\lambda$ is a wavelength at which transmittance is to be increased.

21. The display of claim 20, wherein said insulating film comprises silicon nitride.

22. The display of claim 20, wherein said insulating film has an index of refraction "n" of not smaller than 1.4.

23. The display of claim 20, wherein said pixel electrode comprises ITO.

24. The display of claim 20, wherein said additional electrode is transparent.

25. The display of claim 20, wherein said wavelength $\lambda$ is from 540 to 550 nm.

26. The display of claim 20, wherein said additional electrode at least partially overlaps the gate line of the display, and wherein the gate line is opaque.

27. The display of claim 26, wherein at least one insulating film is provided between the additional electrode and the gate line that is at least partially overlapped by the additional electrode.

28. A liquid crystal display comprising:
at least one transistor supported by a substrate;
a pixel electrode comprising a transparent conductive film electrically connected to the transistor;
an electrode located at least partially between the pixel electrode and a gate line, so that the electrode at least partially overlaps the gate line, and wherein the electrode makes up part of an auxiliary capacitor; and
an insulating film located immediately adjacent the electrode and having a thickness d so as to satisfy the following equation:

$d=\lambda/(2\times n)\times m$ where m is an integer, n is an index of refraction of the insulating film, and $\lambda$ is a wavelength at which transmittance is to be increased, and wherein the index of refraction n of the insulating film is not smaller than 1.4, and
wherein the gate line is opaque.

29. The display of claim 28, wherein the insulating film is located over the additional electrode.

30. A liquid crystal display comprising:
at least one transistor supported by a substrate;
a pixel electrode comprising a transparent conductive film electrically connected to the transistor;
a conductive layer located at least partially between the pixel electrode and a gate line, so that the conductive layer at least partially overlaps the gate line, and wherein the conductive layer makes up part of an auxiliary capacitor; and
an insulating film located immediately adjacent the conductive layer and having a thickness d so as to satisfy the following equation:

$d=\lambda/(2\times n)\times m$ where m is an integer, n is an index of refraction of the insulating film, and $\lambda$ is a wavelength at which transmittance is to be increased, and wherein the index of refraction n of the insulating film is not smaller than 1.4.

31. The display of claim 30, wherein said insulating film comprises silicon nitride.

32. The display of claim 30, wherein said pixel electrode comprises ITO.

33. The display of claim 30, wherein said wavelength $\lambda$ is from 540 to 550 nm.

* * * * *